US012745073B2

(12) United States Patent
Xu

(10) Patent No.: US 12,745,073 B2
(45) Date of Patent: Sep. 22, 2026

(54) METHOD FOR SECONDARY CELL STATE CONFIGURATION, USER EQUIPMENT, AND STORAGE MEDIUM

(71) Applicant: SPREADTRUM COMMUNICATIONS (SHANGHAI) CO., LTD., Shanghai (CN)

(72) Inventor: Min Xu, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 342 days.

(21) Appl. No.: 18/250,170

(22) PCT Filed: Oct. 18, 2021

(86) PCT No.: PCT/CN2021/124419

§ 371 (c)(1),
(2) Date: Apr. 21, 2023

(87) PCT Pub. No.: WO2022/083544

PCT Pub. Date: Apr. 28, 2022

(65) Prior Publication Data

US 2024/0007840 A1 Jan. 4, 2024

(30) Foreign Application Priority Data

Oct. 22, 2020 (CN) ......................... 202011139376.2

(51) Int. Cl.
*H04W 4/02* (2018.01)
*H04W 8/08* (2009.01)
(Continued)

(52) U.S. Cl.
CPC ............ *H04W 8/08* (2013.01); *H04W 36/302* (2023.05)

(58) Field of Classification Search
CPC ..... H04W 8/08; H04W 36/302; H04W 76/15; H04W 76/28; H04W 36/00;
(Continued)

(56) References Cited

U.S. PATENT DOCUMENTS

2016/0269974 A1 9/2016 Dinan
2018/0098266 A1* 4/2018 Futaki ................... H04W 72/04
2022/0167445 A1* 5/2022 Wang ................... H04W 76/27

FOREIGN PATENT DOCUMENTS

CN 107925472 A 4/2018
CN 109963296 A 7/2019
(Continued)

OTHER PUBLICATIONS

Search history (Year: 2025).*
(Continued)

*Primary Examiner* — Moustapha Diaby
(74) *Attorney, Agent, or Firm* — HAUPTMAN HAM, LLP

(57) ABSTRACT

A method for secondary cell (SCell) state configuration, a user equipment (UE), and a storage medium are provided. The method for SCell state configuration is performed by a UE. The method for SCell state configuration includes: receiving an instruction for activating a secondary cell group (SCG) in case that the SCG is in a deactivated state; and configuring the state of an SCell or SCells in the SCG according to indication information contained in the instruction, where the indication information includes an activated state.

3 Claims, 4 Drawing Sheets

(51) Int. Cl.
*H04W 76/00* (2018.01)
*H04W 88/02* (2009.01)
*H04W 88/06* (2009.01)
*H04W 92/02* (2009.01)
*H04W 36/30* (2009.01)

(58) Field of Classification Search
CPC ............. H04W 36/0083; H04W 36/16; H04W 36/165; H04W 52/02; Y02D 30/70
USPC ....................................................... 455/422.1
See application file for complete search history.

(56) References Cited

FOREIGN PATENT DOCUMENTS

CN 110012555 A 7/2019
CN 111526566 A 8/2020
WO 2020186532 A1 9/2020

OTHER PUBLICATIONS

IP.com search history (Year: 2025).*
Interdigital(Rapporteur), R2-1912880, Report on email discussion on [107#32][NR/DCCA]MCG SCell/SCG Resume, 3GPP TSG-RAN WG2#107bis, Oct. 18, 2019.
WIPO, International Search Report and Written Opinion for International Application No. PCT/CN2021/124419, Jan. 20, 2022.
The first office action issued in corresponding CN application No. 202011139376.2 dated Dec. 22, 2022.
Second Office Action issued in corresponding CN application No. 202011139376.2 dated Jul. 25, 2023.
Rejection Decision issued in corresponding CN application No. 202011139376.2 dated Jan. 11, 2024.

* cited by examiner

METHOD FOR SECONDARY CELL STATE CONFIGURATION, USER EQUIPMENT, AND STORAGE MEDIUM

CROSS-REFERENCE TO RELATED APPLICATION(S)

This application is a National Stage of International Application No. PCT/CN2021/124419, field Oct. 18, 2021, which claims priority to Chinese Patent Application No. 202011139376.2, filed Oct. 22, 2020, the entire disclosures of which are hereby incorporated by reference.

TECHNICAL FIELD

This application relates to the field of communication technology, and particularly to a method for secondary cell (SCell) state configuration, a user equipment (UE), and a storage medium.

BACKGROUND

In 3rd generation partnership project (3GPP) new radio (NR), an air interface of a user equipment (UE) has three states: an RRC_IDLE state, an RRC_INACTIVE state, and an RRC_CONNECTED state. The UE in an IDLE state is not connected with a base station, and needs to periodically initiate location updates as well as cell selection and reselection procedures, and receive paging, etc. The UE in a CONNECTED state is connected with a network, the network will configure a radio bearer, a physical layer configuration, and other configurations for the UE, including a dual connectivity (DC) operation and a carrier aggregation (CA) operation (controlled by a same base station), and the network can schedule uplink and downlink data for the UE. The DC operation involves a same-frequency scenario or a different-frequency scenario, at least two cells are controlled by different base stations (e.g., gNB), and the DC operation can be categorized, according to different core networks connected, as multi-rat dual connectivity (MR-DC) using an evolved packet core (EPC) and MR-DC using a 5G core (5GC) network. The MR-DC using the EPC includes E-UTRA-NR dual connectivity (EN-DC), an E-UTRA base station is a master node (MN), and an SN base station is a secondary node (SN). The MR-DC using the 5GC includes NG-RAN E-UTRA-NR dual connectivity (NGEN-DC), NR-E-UTRA dual connectivity (NE-DC), and NR-NR dual connectivity (NR-DC). When the UE has data to be transmitted, the non-access-stratum (NAS) of the UE will transmit the data to service data adaptation protocol (SDAP) according to protocol data unit (PDU) session, the SDAP can map the data of a certain quality of service (QoS) flow to a corresponding data radio bearer (DRB) according to configured mapping information, and the data can be transmitted to a packet data convergence protocol (PDCP) corresponding to the DRB after transmission recovery.

At present, when a secondary cell group (SCG) is suspended, a secondary cell (SCell) has the following states: an activated state, a dormant state or a state configured with a long discontinuous reception (DRX) cycle, and a deactivated state. When the SCell is in the activated state, data is transmitted and received normally, when the SCell is in the deactivated state, data transmission and reception, reference signal reception, measurement reporting, etc., are not performed. In order to save power and quickly resume data transmission of the SCell in the dormant state, when the SCell is in the dormant state, only channel state information (CSI) measurement or beam management, etc. are performed, while other data transmission and reception is not performed.

FIG. 1 illustrates a process of entering or leaving the SCG suspension (i.e., deactivation) in the related art. Entering or leaving the suspension of the UE can be configured through a radio resource control (RRC) message, or can be indicated through medium access control (MAC) control element (CE) or a lower-layer indication (e.g., a PHY indication, downlink control information (DCI), and so on). When the SCG is in the deactivated state, the UE can perform radio resource management (RRM) on cells in the SCG, and report measurement results to the MN through SRB1; alternatively, the UE does not perform RRM on the cells in the SCG.

When a network side decides to activate the SCG according to other information or services of the UE, the network side will send an activation indication to the UE through the MN, and then the UE can initiate a random access channel (RACH) procedure on a primary secondary cell (PSCell), obtain information such as timing advance (TA) and beam, and resume data transmission. However, since states of other SCells are uncertain, and if the network side does not have measurement results of relevant SCells and activates blindly, radio link failure may occur, and data transmission of the UE may be affected. Further, currently, the activated state or the deactivated state of the SCell can be indicated through RRC or MAC CE, but before entering the dormant state, the SCell needs to be configured to be in the activated state first and then enter the dormant state through indication of DCI, which will inevitably bring certain signaling cost and delay.

SUMMARY

A first aspect of the disclosure provides a method for secondary cell (Scell) state configuration. The method for SCell state configuration is performed by a user equipment (UE). The method for SCell state configuration includes: receiving an instruction for activating a secondary cell group (SCG) in case that the SCG is in a deactivated state; and configuring the state of an SCell or SCells in the SCG according to indication information contained in the instruction, where the indication information includes an activated state.

A second aspect of the disclosure provides a UE. The UE includes a transceiver, at least one processor, and a memory. The at least one processor is in communication connection with the transceiver. The memory is in communication connection with the at least one processor, and stores instructions executable by the at least one processor. The instructions, when executed by the at least one processor, are operable with the at least one processor to execute the method described in the first aspect.

A third aspect of the disclosure provides a non-transitory computer-readable storage medium. The non-transitory computer-readable storage medium stores computer instructions which, when executed by a processor, cause the processor to execute the method described in the first aspect.

DETAILED DESCRIPTION

Hereinafter, the disclosure will be further depicted with reference to implementations, and these implementations, however, are not intended to limit the disclosure.

Exemplary application scenarios of implementations of the disclosure will be introduced below.

Technical solutions of the disclosure can be applicable to a fifth generation (5G) communication system, a fourth generation (4G) communication system, a third generation (3G) communication system, and various new communication systems in the future, such as a sixth generation (6G) communication system and a seventh generation (7G) communication system. The technical solutions of the disclosure can also be applicable to different network architectures, including but not limited to a relay network architecture, a dual-link architecture, a vehicle-to-everything communication architecture, and other architectures, which is not limited in the disclosure.

Figure 1:
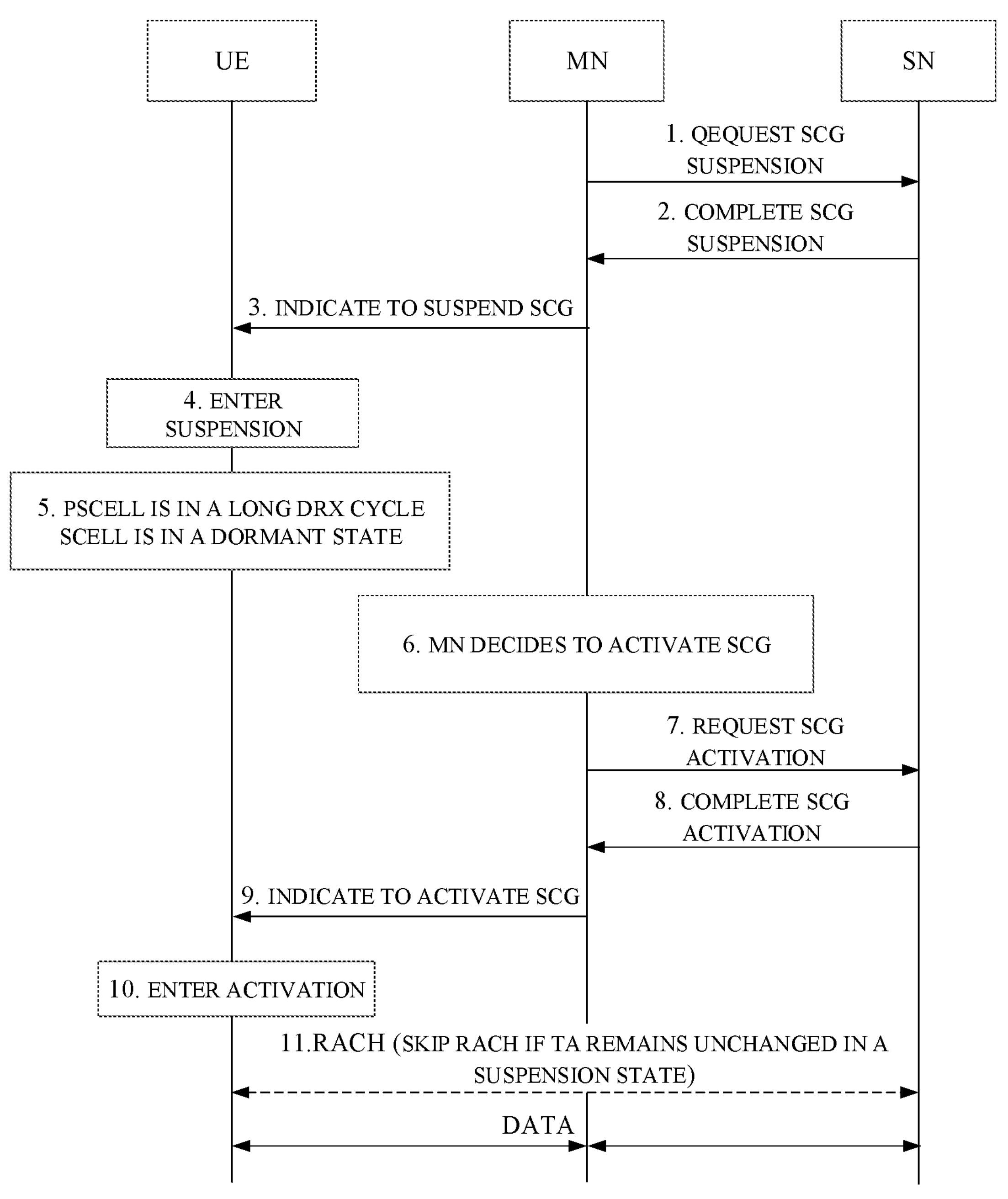
FIG. 1 is a flow chart of entering or leaving secondary cell group (SCG) suspension in the related art.
Figure 2:
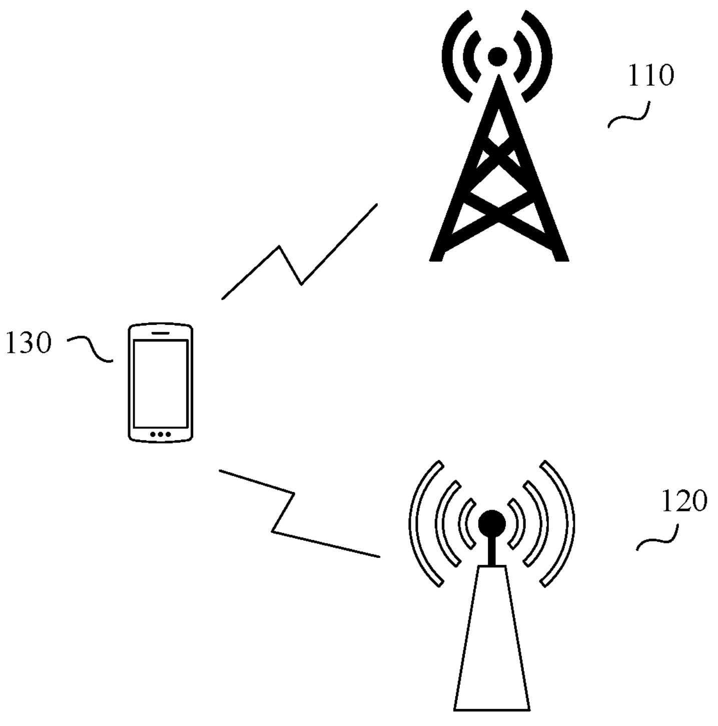
FIG. 2 is a schematic diagram illustrating a communication network architecture provided in implementations of the disclosure.

FIG. 2 is a schematic diagram illustrating a communication network architecture provided in implementations of the disclosure. As illustrated in FIG. 2, a user equipment (UE) 130 supports multi-rat dual connectivity (MR-DC), and an access network device 110 and an access network device 120 jointly provide data transmission services for the UE 130, where the access network device 110 is a master node (MN), and the access network device 120 is a secondary node (SN). The access network device 110 may also be called master base station or master access network device, and the access network device 120 may also be called secondary base station or secondary access network device.

In implementations of the disclosure, the UE 130 may be various types of equipment providing voice and/or data connectivity for users, for example, a handheld device with a wireless connection function or a processing device connected to a wireless modem. As an example, the UE 130 may include a mobile phone (or called a cellular phone), a computer with a mobile terminal, a portable, pocket, handheld, computer built-in or vehicle-mounted mobile device, a smart wearable device, and the like. As another example, the UE 130 may include a personal communication service (PCS) phone, a cordless phone, a session initiation protocol (SIP) phone, a wireless local loop (WLL) station, personal digital assistant (PDA), a smart bracelet, a smart watch, and other devices. The UE 130 may further include a limited device, such as a device with low power consumption, or a device with limited storage capabilities, or a device with limited computing capabilities, etc. For instance, the UE 130 includes a barcode, radio frequency identification (RFID), a sensor, a global positioning system (GPS), a laser scanner, and other information sensing devices. The UE may communicate with a core network via an access network such as a radio access network (RAN), and exchange voice and/or data with the RAN. In addition, chips used in the above devices/equipment may also be referred to as UE.

In implementations of the disclosure, the access network device 110 and the access network device 120 each may be a base station defined by 3GPP. For example, the access network device 110 and the access network device 120 each can be a base station in a long term evolution (LTE) system, that is, an evolved NodeB (eNB/eNodeB), and can also be equipment at an access network side in a new radio (NR) system, including a gNB, a transmission/reception point (TRP), etc. In addition, if an eNB accesses a 5G core (5GC) network, an LTE eNB can also be called eLTEeNB. Specifically, the eLTEeNB is an LTE base station evolved on the basis of the LTE eNB, which can be directly connected to 5G CN, and the eLTEeNB is also a base station in NG-RAN. The access network device 110 or the access network device 120 may also be a wireless terminal (WT) such as an access point (AP) or an access controller (AC), or other equipment capable of communicating with terminals and core networks, such as relay equipment, vehicle-mounted equipment, smart wearable equipment, etc., and the type of the equipment is not limited in implementations of the disclosure.

In implementations of the disclosure, the access network device 110, the access network device 120, and equipment corresponding to the core network are collectively referred to as network device. When a secondary cell group (SCG) is set to be in a deactivated or suspended state, for an SCG data radio bearer, the UE 130 may transmit an SCG activation request to the network device according to an uplink data transmission state to request the network device to activate the SCG.

Implementation 1

The method for secondary cell (SCell) state configuration of this implementation can be executed by an apparatus for SCell state configuration. The apparatus can be implemented by means of software and/or hardware. The apparatus may be a UE or a network device. The method for SCell state configuration will be depicted below with the execution entity being the UE or the network device.

Figure 3:
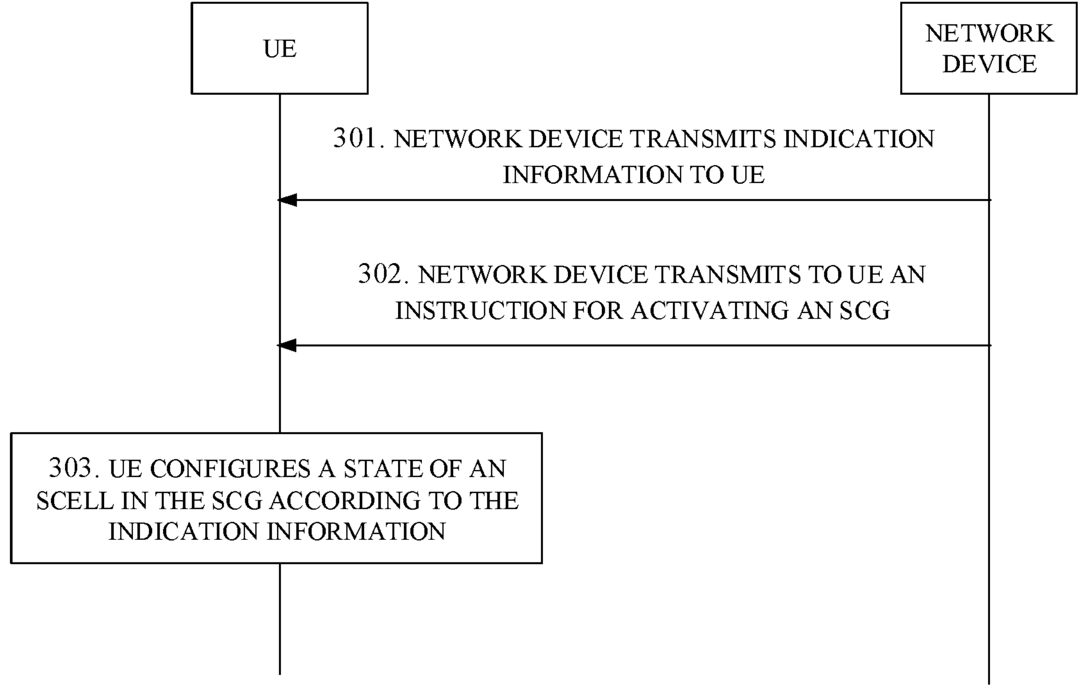
FIG. 3 is a schematic flowchart illustrating a method for secondary cell (SCell) state configuration provided in implementation 1 of the disclosure.

FIG. 3 is a schematic flowchart illustrating a method for SCell state configuration provided in this implementation. As illustrated in FIG. 3, the method for SCell state configuration of this implementation includes the following.

At 301, a network device transmits indication information to a UE, where the indication information is indicative of a state of an SCell in an SCG. The SCG is also called SN. In a specific example, different SCells are identified through SCellIndexi, where i=1, 2, . . . , N, and N is the number (that is, quantity, how many) of these SCells.

In a specific implementation, the indication information is a radio resource control (RRC) message such as an RRC reconfiguration message, and the indication information may also be medium access control (MAC) control element (CE) or downlink control information (DCI).

In an optional implementation, the indication information includes an activated state, a deactivated state, a dormant state, or a state of an SCell when an SCG is deactivated.

In another optional implementation, the indication information includes remaining in a current state (that is, remaining in a state when the SCG is deactivated), or restoring to a state before the SCG is deactivated. Taking MAC CE as an example of the indication information, an SCell activation/deactivation MAC CE of a single octet is defined as follows:

| $C_7$ | $C_6$ | $C_5$ | $C_4$ | $C_3$ | $C_2$ | $C_1$ | R | Oct. 1 |
|---|---|---|---|---|---|---|---|---|

where Ci represents a state of an SCell corresponding to SCelllndexi, "0" represents remaining in a current state, and "1" represents restoring to a state before deactivation of the SCG.

At 302, the network device transmits to the UE an instruction for activating the SCG.

At 303, the UE configures the state of the SCell in the SCG according to the indication information.

In this implementation, the network device first transmits to the UE the indication information indicative of the state(s) of the SCell(s) before transmitting the instruction for activating the SCG to the UE, and the UE can directly configure the state of each SCell according to the indication information upon reception of the instruction for activating the SCG, which can improve efficiency of data transmission without incurring additional signaling overhead and latency.

Figure 4:
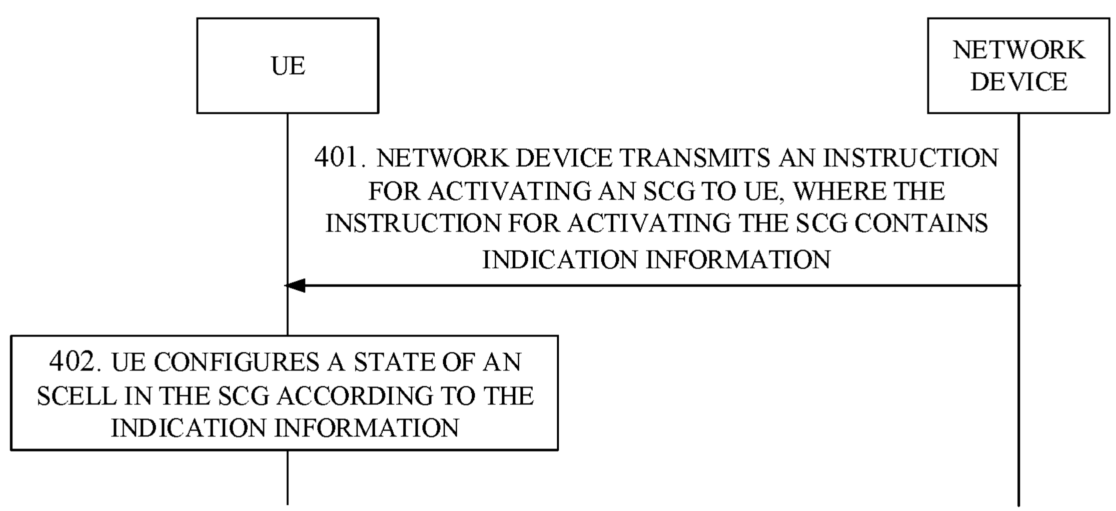
FIG. 4 is a schematic flowchart illustrating another method for S Cell state configuration provided in implementation 1 of the disclosure.

FIG. 4 is a schematic flowchart illustrating another method for S Cell state configuration provided in this implementation. As illustrated in FIG. 4, the method for SCell state configuration of this implementation includes the following.

At 401, a network device transmits an instruction for activating an SCG to a UE, where the instruction for activating the SCG contains indication information. The indication information is indicative of a state of an SCell in the SCG, and the indication information includes an activated state, a deactivated state, a dormant state, remaining in a current state, or restoring to a state before deactivation of the SCG.

At 402, the UE configures the state of the SCell in the SCG according to the indication information.

In this implementation, the network device transmits to the UE the instruction for activating the SCG, and the UE can directly configure the state of each SCell according to the indication information indicative of the state(s) of the SCell(s) and contained in the instruction, which can improve efficiency of data transmission without incurring additional signaling overhead and latency.

Implementation 2

The method for SCell activation of this implementation can be executed by an apparatus for SCell activation. The apparatus can be implemented by means of software and/or hardware. The apparatus may be a UE or a network device. The method for SCell activation will be depicted below with the execution entity being the UE or the network device.

Figure 5:
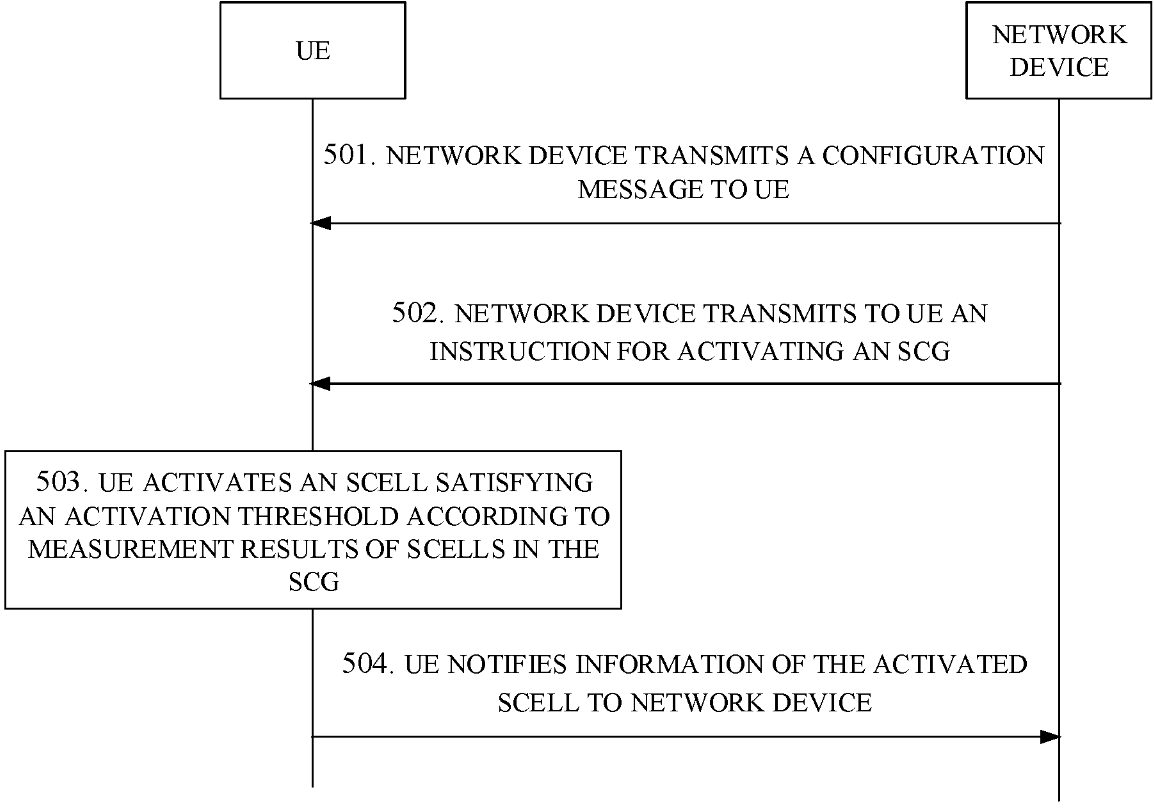
FIG. 5 is a schematic flowchart illustrating a method for SCell activation provided in implementation 2 of the disclosure.

FIG. 5 is a schematic flowchart illustrating a method for SCell activation provided in this implementation. As illustrated in FIG. 5, the method for SCell activation of this implementation includes the following.

At 501, a network device transmits a configuration message to a UE, where the configuration message contains an activation threshold. In a specific implementation, an SN transmits a configuration message to the UE. In another specific implementation, an SN transmits a configuration message to an MN, and the MN transmits the configuration message to the UE.

At 502, the network device transmits to the UE an instruction for activating an SCG.

At 503, the UE activates an SCell satisfying the activation threshold according to measurement results of SCells in the SCG.

In a specific implementation, the measurement result of the S Cell includes a signal quality and/or beam information. Accordingly, the activation threshold includes a signal-quality threshold and/or a beam-information threshold. The signal quality may include a reference signal receiving power (RSRP), a reference signal receiving quality (RSRQ), and/or a signal to interference plus noise ratio (SINR). In a specific example, the configuration message includes a signal-quality threshold. After receiving an instruction for activating an SCG, a UE determines whether a signal quality of an SCell in the SCG reaches the signal-quality threshold. If the signal quality of the SCell reaches the signal-quality threshold, the SCell will be activated. Conversely, if the signal quality of the SCell does not reach the signal-quality threshold, the SCell will not be activated, or the SCell will remain in a state when the SCG is deactivated, or the SCell will be set to be in a deactivated state. In another specific example, the configuration message includes a beam-information threshold. After receiving an instruction for activating an SCG, a UE determines whether beam information of an SCell in the SCG reaches the beam-information threshold. If the beam information of the SCell reaches the beam-information threshold, the SCell will be activated. Conversely, if the beam information of the SCell does not reach the beam-information threshold, the SCell will not be activated. In another specific example, the configuration message includes a signal-quality threshold and a beam-information threshold. After receiving an instruction for activating an SCG, a UE determines whether a signal quality of an SCell in the SCG reaches the signal-quality threshold and whether beam information of the SCell reaches the beam-information threshold. If the signal quality of the SCell reaches the signal-quality threshold and the beam information of the SCell reaches the beam-information threshold, the SCell will be activated. Conversely, if the signal quality of the SCell does not reach the signal-quality threshold or the beam information of the SCell does not reach the beam-information threshold, the SCell will not be activated.

In an optional implementation, the configuration message further contains a cell list, where the cell list includes some SCells in the SCG. In this implementation, the operations at 503 specifically include the following. The UE activates an SCell satisfying the activation threshold in the cell list according to the measurement results of the SCells in the SCG. In this implementation, the UE only activates the SCell(s) satisfying the activation threshold in the cell list upon reception of the instruction for activating the SCG.

In an optional implementation, different SCells correspond to different activation thresholds. The operations at 503 specifically include the following. For each of the SCells in the SCG: whether the measurement result of the SCell satisfies an activation threshold corresponding to the SCell is determined; if the measurement result of the SCell satisfies the activation threshold corresponding to the SCell, the SCell is activated; conversely, if the measurement result of the SCell does not satisfy the activation threshold corresponding to the SCell, the SCell is not activated.

In an optional implementation, after the operations at 503, the method further includes the following. At 504, the UE notifies information of the activated SCell to the network device, where the information transmitted by the UE to the network device may include a signal quality, beam information, an identifier of the activated SCell, etc. The network device of this implementation is an SN, and the SN receives the information of the SCell activated by the UE.

In this implementation, the network device first transmits the configuration message to the UE before transmitting the instruction for activating the SCG to the UE, and the UE can activate an SCell(s) satisfying a condition according to the configuration message and the measurement results of the SCells upon reception of the instruction for activating the SCG, while an SCell(s) that does not satisfy the condition is not activated, to maintain a state when the SCG is suspended, that is, the SCell(s) satisfying the condition is activated selectively, which can avoid occurrence of radio link failure, thereby improving reliability of data transmission of the UE.

Implementation 3

Figure 6:
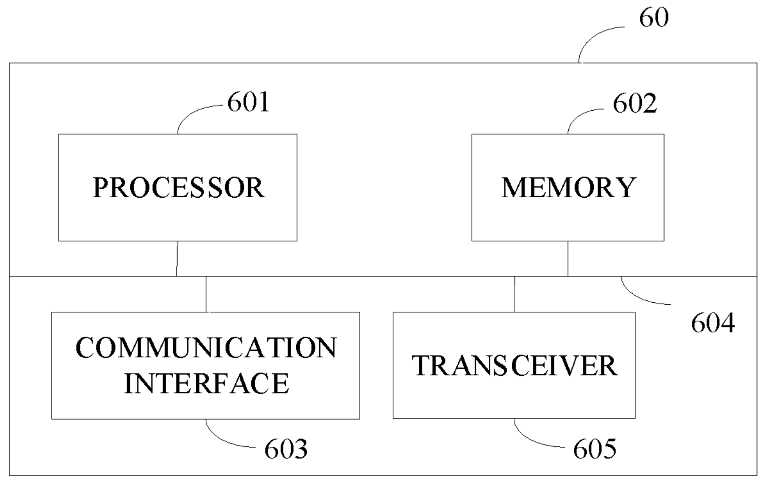
FIG. 6 is a block diagram illustrating a user equipment (UE) provided in implementation 3 of the disclosure.

Implementations of the disclosure provide a UE. As illustrated in FIG. 6, a UE 60 includes at least one processor 601, a memory 602, a communication interface 603, and a transceiver 605. The processor 601, the memory 602, the communication interface 603, and the transceiver 605 are connected to each other through a bus 604. The memory stores instructions executable by the at least one processor. The instructions, when executed by the at least one processor, are operable with the at least one processor to execute the method for SCell state configuration in implementation 1 or the method for SCell activation in implementation 2.

Implementations of the disclosure provide a non-transitory computer-readable storage medium. The non-transitory computer-readable storage medium stores computer instructions which are operable with a computer to execute the method for SCell state configuration in implementation 1 or the method for SCell activation in implementation 2.

Specifically, the readable storage medium may include, but is not limited to, a portable disk, a hard disk, a random access memory (RAM), a read-only memory (ROM), an erasable programmable ROM, an optical storage device, a magnetic storage device, or any suitable combination of the above.

In a possible implementation, the disclosure may also be implemented in a form of a program product. The program product includes program codes. When the program product is run on a terminal device, the program codes cause the terminal device to execute the method for SCell state configuration in implementation 1 or the method for SCell activation in implementation 2. The program codes for implementing the disclosure may be written in any combination of one or more programming languages. The program codes may be executed entirely on UE, executed partly on the UE, executed as a separate software package, executed partly on the UE and partly on a remote device, or executed entirely on the remote device.

A technical problem to be solved in the disclosure is to overcome the above deficiencies of the related art, and therefore methods for SCell state configuration, methods for SCell activation, a UE, a network device, and a storage medium are provided.

In the disclosure, the above technical problem is solved through the following technical solutions.

A first aspect of the disclosure provides a method for SCell state configuration. The method for SCell state configuration includes: receiving indication information, where the indication information is indicative of a state of an SCell in an SCG, and the indication information includes an activated state, a deactivated state, a dormant state, remaining in a current state, or restoring to a state before deactivation of the SCG; and configuring the state of the SCell in the SCG according to the indication information, upon reception of an instruction for activating the SCG.

Optionally, receiving the indication information includes: receiving the instruction for activating the SCG, where the instruction for activating the SCG contains the indication information.

Optionally, the indication information is a radio resource control (RRC) message, medium access control (MAC) control element (CE), or downlink control information (DCI).

A second aspect of the disclosure provides a method for SCell state configuration. The method for SCell state configuration includes: transmitting indication information to a UE, such that the UE configures a state of an SCell in an SCG according to the indication information upon reception of an instruction for activating the SCG, where the indication information is indicative of the state of the SCell in the SCG, and the indication information includes an activated state, a deactivated state, a dormant state, remaining in a current state, or restoring to a state before deactivation of the SCG.

Optionally, transmitting the indication information to the UE includes: transmitting to the UE the instruction for activating the SCG, where the instruction for activating the SCG contains the indication information.

Optionally, the indication information is an RRC message, MAC CE, or DCI.

A third aspect of the disclosure provides a method for SCell activation. The method for SCell activation includes: receiving a configuration message, where the configuration message contains an activation threshold; and activating an SCell satisfying the activation threshold according to measurement results of SCells in an SCG, upon reception of an instruction for activating the SCG.

Optionally, the configuration message further contains a cell list, and activating the SCell satisfying the activation threshold according to the measurement results of the SCells in the SCG includes: activating an SCell satisfying the activation threshold in the cell list according to the measurement results of the SCells in the SCG.

Optionally, activating the SCell satisfying the activation threshold according to the measurement results of the SCells in the SCG includes: for each of the SCells in the SCG: determining whether the measurement result of the SCell satisfies an activation threshold corresponding to the SCell; and activating the SCell when the measurement result of the SCell satisfies the activation threshold corresponding to the SCell.

Optionally, the method further includes: notifying information of the activated SCell to a network device.

Optionally, the measurement result of the SCell includes a signal quality and/or beam information.

A fourth aspect of the disclosure provides a method for SCell activation. The method for SCell activation includes: transmitting to a UE a configuration message containing an activation threshold, such that the UE activates an SCell satisfying the activation threshold according to measurement results of SCells in an SCG upon reception of an instruction for activating the SCG.

Optionally, the configuration message further contains a cell list, and the UE activates an SCell satisfying the activation threshold in the cell list according to the measurement results of the SCells in the SCG upon reception of the instruction for activating the SCG.

Optionally, different SCells correspond to different activation thresholds.

Optionally, the method further includes: receiving information of an SCell activated by the UE.

A fifth aspect of the disclosure provides a UE. The UE includes at least one processor and a memory. The memory is in communication connection with the at least one processor, and stores instructions executable by the at least one processor. The instructions, when executed by the at least one processor, are operable with the at least one processor to execute the method described in the first aspect or the method described in the third aspect.

A sixth aspect of the disclosure provides a network device. The network device includes at least one processor and a memory. The memory is in communication connection with the at least one processor, and stores instructions executable by the at least one processor. The instructions, when executed by the at least one processor, are operable with the at least one processor to execute the method described in the second aspect or the method described in the fourth aspect.

A seventh aspect of the disclosure provides a non-transitory computer-readable storage medium. The non-transitory computer-readable storage medium stores computer instructions which are operable with a computer to execute the methods described in the first aspect to the fourth aspect.

Advantageous effects of the disclosure reside in that:

On the one hand, the network device transmits to the UE the indication information indicative of the state(s) of the SCell(s), and the UE can directly configure the state of each SCell according to the indication information upon reception of the instruction for activating the SCG, which can improve efficiency of data transmission without incurring additional signaling overhead and latency.

On the other hand, the network device first transmits the configuration message to the UE before transmitting the instruction for activating the SCG to the UE, and the UE activates a SCell(s) satisfying a condition according to the configuration message and the measurement results of the SCells upon reception of the instruction for activating the SCG, that is, the SCell(s) satisfying the condition is activated selectively, which can avoid occurrence of radio link failure, thereby improving reliability of data transmission of the UE.

While specific implementations of the disclosure have been depicted above, it will be understood by those skilled in the art that the above implementations are illustrative merely, and the scope of the disclosure is defined by the appended claims. Various changes and modifications may be made by those skilled in the art without departing from the principle and spirit of the disclosure, and such changes and modifications, however, shall all be encompassed within the protection scope of the disclosure.

What is claimed is:

1. A method for secondary cell (SCell) state configuration, performed by a user equipment (UE) and comprising:

receiving indication information for activating a secondary cell group (SCG) in case that the SCG is in a deactivated state; and configuring a state of one or more SCells in the SCG according to the indication information, wherein the indication information comprises an activated state and is indicative of the state of the one or more SCells in the SCG, and wherein the indication information is one radio resource control (RRC) message.

2. A user equipment (UE), comprising:

a transceiver;

at least one processor, in communication connection with the transceiver; and a memory, in communication connection with the at least one processor and storing instructions executable by the at least one processor;

the instructions, when executed by the at least one processor, being operable with the at least one processor to:

cause the transceiver to receive indication information for activating a secondary cell group (SCG) in case that the SCG is in a deactivated state; and configure a state of one or more secondary cells (SCell) in the SCG according to the indication information, wherein the indication information comprises an activated state and is indicative of the state of the one or more SCells in the SCG, and wherein the indication information is one radio resource control (RRC) message.

3. A non-transitory computer-readable storage medium storing computer instructions which, when executed by a processor, cause the processor to carry out actions, comprising:

receiving indication information for activating a secondary cell group (SCG) in case that the SCG is in a deactivated state; and configuring a state of one or more secondary cells (SCell) in the SCG according to the indication information, wherein the indication information comprises an activated state and is indicative of the state of the one or more SCells in the SCG, and wherein the indication information is one radio resource control (RRC) message.

* * * * *